(12) United States Patent
Bassam et al.

(10) Patent No.: US 6,414,063 B1
(45) Date of Patent: Jul. 2, 2002

(54) NUCLEATED PET/PEN POLYESTER COMPOSITIONS

(75) Inventors: Farideh Bassam; Michael David Thompson; Barry Woodfine, all of Guildford (GB)

(73) Assignee: Kobe Steel, Ltd., Kobe (JP)

( * ) Notice: Subject to any disclaimer, the term of this patent is extended or adjusted under 35 U.S.C. 154(b) by 0 days.

(21) Appl. No.: 09/646,095

(22) PCT Filed: Mar. 19, 1999

(86) PCT No.: PCT/GB99/00869

§ 371 (c)(1),
(2), (4) Date: Sep. 20, 2000

(87) PCT Pub. No.: WO99/48978

PCT Pub. Date: Sep. 30, 1999

(30) Foreign Application Priority Data

Mar. 26, 1998 (GB) ................................................ 9806535

(51) Int. Cl.[7] ............................................... C08L 67/02
(52) U.S. Cl. ...................... 524/398; 524/394; 524/539; 525/444; 528/305
(58) Field of Search ................................ 524/398, 394; 525/444; 528/305

(56) References Cited

U.S. PATENT DOCUMENTS 3,575,931 A  *  4/1971  Sherman
4,366,273 A  * 12/1982  Aharoni

FOREIGN PATENT DOCUMENTS

JP        2-276855       * 11/1990

* cited by examiner

*Primary Examiner*—Patricia A. Short
(74) *Attorney, Agent, or Firm*—Oblon, Spivak, McClelland, Maier & Neustadt, P.C.

(57) ABSTRACT

The application relates to a composition poly[ethylene terephthalate] (PET) and poly[ethylene naphthalate] (PEN), in the form of a polymer blend and/or copolymer, in which the PET:PEN mol ratio is from 20:80 to 80:20, and from 0.1 to 5.0 wt. %, based on the total weight of the composition, of a transition metal salt of a carboxylic acid.

10 Claims, No Drawings

NUCLEATED PET/PEN POLYESTER COMPOSITIONS

This invention relates to nucleated polyester compositions, and more particularly to compositions containing both poly[ethylene terephthalate] (PET) and poly[ethylene naphthalate] (PEN), known hereafter as PET/PEN compositions, which can be nucleated to form semi-crystalline products.

It is known that medium content PET/PEN compositions (compositions with PET:PEN ratios around 50:50) are amorphous in nature. The range of compositions which display this amorphous behaviour is generally accepted to be around PET:PEN=20:80 to PET:PEN=80:20, as described by two PEN manufacturers—Shell (see FIG. 1 of presentation to "BevPak" conference, Spring 1995, USA) and Hoechst-Trevira (page 4 of Polyclear® N technical literature). The disadvantage of this behaviour is that the use temperature of compositions in the 80/20–20/80 region is substantially reduced. The use temperature is dependent on the glass transition temperature (Tg) in this region. In contrast, the use temperature of PET/PEN compositions with <20% PET or <20% PEN is dependent on the crystalline melt temperature (Tm). Tm is over 100° C. higher than the Tg for PET/PEN compositions; hence resulting in the substantial reduction in use temperature observed in the 20/80–80/20 composition region. The same observations on the amorphous/crystalline nature of PET/PEN compositions were also made by Lu and Windle (see FIG. 2 in Polymer 36 (1995), pages 451–459) and Andresen and Zachmann (Colloid & Polymer Science 272 (1994), page 1352). Andresen and Zachmann also found that blends of PET and PEN formed a single phase within 2 minutes of melting. This is usually good evidence for rapid formation of a PET/PEN copolyester by transesterification. Thus the behaviour of PET/PEN blends and copolymers can be expected to be the same with regards to crystallisation during all melt processing operations. In the case of bottle manufacture using PET/PEN copolymers and blends, U.S. Pat. No. 5,628,957 (to Continental PET Technologies Inc.) states that mid-range PET/PEN compositions containing 20–80% PEN are substantially amorphous and describes the use of an additional strain-hardenable (ie. crystallisable) layer for these mid-range PET/PEN bottles.

It would be advantageous therefore to be able to nucleate these medium content PET/PEN compositions to take advantage of higher thermal capability offered by the Tm of the composition. A number of patent publications describe the use of various nucleating agents for crystallising modified PET compositions, including modification by the use of naphthalene dicarboxylic acid in place of terephthalic acid, ie PET/PEN compositions.

The use of alkali or alkaline earth metal salts of carboxylic acids as chemical nucleating agents to crystallise modified PET compositions is well known, see for example EP 517,511 A2 (Polyplastics Co Ltd), EP 21,648 (ICI), GB 1,282,679 (Hoechst A. G.), U.S. Pat. No. 3,673,139 (Sandoz Ltd), U.S. Pat. No. 4,351,757 (E. I. Du Pont de Nemours & Co), U.S. Pat. No. 4,352,904 (E. I. Du Pont de Nemours & Co), U.S. Pat. No. 4,357,268 (Allied Corp), U.S. Pat. No. 4,366,273 (Allied Corp), U.S. Pat. No. 4,368,286 (Mitsubishi Chemical Industries Ltd), U.S. Pat. No. 4,425,470 (E. I. Du Pont de Nemours & Co), U.S. Pat. No. 4,486,561 (Ethyl Corp), U.S. Pat. No. 4,880,860 (Hoechst A. G.), U.S. Pat. No. 4,886,847 (Montefiber S. p. A.), U.S. Pat. No. 5,002,990 (Montefiber S. p. A.), U.S. Pat. No. 5,356,972 (Instituto Guido Donegani S.p.A. and Enichem S.p.A). These documents teach that the best crystallisation behaviour is obtained from the use of alkali metal salts of aromatic carboxylic acids in conjunction with a plasticising additive. Amongst the alkali metal salts, those of sodium are preferred. Other useful metals include potassium, lithium, barium, magnesium and calcium. It is advantageous if the carboxylic acid is an aromatic acid rather than an aliphatic one and if the acid is monosubstituted in each aromatic ring. Disubstitution in particular adversely affects any nucleation behaviour. Particularly preferred compounds are sodium salts of benzoic acids. Many of these documents also teach that the use of sodium salts is restricted to modified PET compositions containing >80% PET content, see for example U.S. Pat. Nos. 3,673,139, 4,351,757, 4,352,904, 4,357,268, 4,368,286, 4,425,470, 4,486,561, 4,886,847 and 5,356,972. This is in agreement with the current state-of-the-art knowledge in the PET/PEN field as documented by Shell and Hoechst-Trevira.

We have surprisingly found that the use of metal salts of carboxylic acids other than those of alkali or alkaline earth metals can cause nucleation and crystallisation of PET/PEN compositions. This is especially suprising as we have found that medium content PET/PEN compositions cannot be nucleated effectively by sodium benzoate (see Comparative Example 8 below), one of the most preferred nucleating agents for PET, in contrast to the teachings of the patent publications cited above.

We have sought to provide a means of producing semi-crystalline PET/PEN compositions across a wide range of PET:PEN ratios, including the 20:80 to 80:20 PET:PEN composition range which is usually amorphous rather than semi-crystalline in nature.

The present invention provides use of a transition metal salt of a carboxylic acid as a nucleating agent in a composition comprising PET and PEN, in the form of a polymer blend and/or copolymer.

The invention also provides a composition comprising poly[ethylene terephthalate] (PET) and poly[ethylene naphthalate] (PEN), in the form of a polymer blend and/or copolymer, in which the PET:PEN mol ratio is from 20:80 to 80:20, and from 0.1 to 5.0 wt %, based on the total weight of the composition, of a transition metal salt of a carboxylic acid.

The PET:PEN mole ratio is preferably from 40:60 to 60:40.

The PEN is preferably poly[ethylene naphthalene-2,6-dicarboxylate].

The invention relates to the use of 0.1–5.0 wt %, preferably 0.25–1.5 wt %, more preferably 0.3 to 0.5 wt %, of a transition metal salt of a carboxylic acid as a nucleating agent for PET/PEN compositions. The metal is selected from A below, where the group of elements refers to current IUPAC nomenclature as set out in Chemical & Engineering News 63 (1985), 27.

The use of mixed metal salts, or double metal salts, selected entirely from within A or a combination of a metal from A together with a metal from B may be more effective than the use of a single metal in some cases. It is recognised that a combination of metals selected from A and B may also be more effective than two metals selected entirely from within A. The ability to use aliphatic carboxylic acids, and polymeric aliphatic carboxylic acids, in addition to aromatic carboxylic acids is a distinct advantage. The carboxylic acid is preferably a lower aliphatic carboxylic acid containing up to six C-atoms, e.g. acetic acid.

The metal groups A and B referred to above are as follows:
- A—from the transition group of metals (Groups 3–12). Preferred metals include zinc, copper, molybdenum, chromium, nickel, vanadium, cobalt, iron, tungsten, titanium and the most preferred is zinc.
- B—from the alkali metals of Group 1. Preferred metals are lithium, potassium, sodium and the most preferred is sodium.

It can be clearly seen from Examples 13 and 14 that the effectiveness of zinc salts increases at addition levels around 0.5 wt %. This further demonstrates that the presence of any residual polymerisation catalysts containing zinc or other metal salts in medium content PET/PEN compositions (normally present at levels of <500 ppm) cannot effectively nucleate these compositions in the absence of additional metal salt loading.

The use of metal salts of organic acids provides fast crystallisation of medium content PET/PEN compositions allowing their use in a wide variety of melt processing techniques and products. The straightforward and accessible nature of these materials simplifies compounding operations of the nucleating agent with the PET/PEN composition. The low level of nucleating agent addition does not have detrimental effects on many of the material or product properties. In fact, the rapid development of crystallinity of these compositions has beneficial effects in many aspects of the material or product properties on which the overall level and type of crystallinity impinges, including heat distortion temperature, mechanical properties, barrier properties, dimensional stability, mould release, surface appearance and so on. The fast development of crystallinity in PET/PEN compositions allows shorter cycle times to be used in the melt processing of the compositions. This leads to improved productivity and economic benefits.

The compositions may consist essentially of the PET, PEN and transition metal salt as specified above. Common additives at levels up to 1 wt % may be present.

The composition can be formed into shaped products, e.g. moulded articles such as bottles, and also fibers and films. Compositions for bottles may contain dyes at less than 1 wt %, but generally no other additives. Compositions for fibers or films may contain dyes at less than 1 wt %, processing aids at less than 2 wt %, and fillers at less than 10 wt %, generally less than 5 wt % (all percentages based on total weight).

The invention is illustrated by the following Examples.

Comparative Examples 1–12
and

EXAMPLES 13–20

Example materials of compositions as detailed in the Table were prepared by twin screw extrusion. The materials were tested for their crystallisation characteristics by DSC (differential scanning calorimetry) measurements. The "half-time" to crystallinity development under isothermal conditions (at 195° C.) was measured. If no crystallinity developed within 10 minutes, the isothermal run was halted and an absence of crystallisation recorded. A second experiment determined the peak temperature at which crystallinity developed in the material whilst cooling the material from the melt at a rate of 10° C./minute. If no crystallisation was observed by the time the material had cooled to 60° C., the run was halted and an absence of crystallisation recorded. The results of these experiments are presented in the Table.

Abbreviations used in the Table are as follows;

GF—glass fiber

NaBz—sodium benzoate

ZnAc—zinc acetate

CuAc—copper acetate

CrAcac—chromium acetylacetate

V Acac—vanadium acetylacetate

FeAc—iron acetate

TiBut—titanium butoxide

ND—not determined

TABLE

| Example | PEN:PET ratio | Additive content | Isothermal crystallisation time (mins) | Temperature of crystallisation on cooling from melt (° C.) |
|---|---|---|---|---|
| 1 | 100:0 | — | 1.34 | 218 |
| 2 | 90:10 | — | ND | 185 |
| 3 | 70:30 | — | absent | 105 |
| 4 | 50:50 | — | absent | 99 |
| 5 | 30:70 | — | 4.40 | 89 |
| 6 | 10:90 | — | 2.20 | 168 |
| 7 | 0:100 | — | 2.97 | 179 |
| 8 | 50:50 | NaBz = 0.5 | 2.87 | 158 |
| 9 | 90:10 | NaBz = 0.8 | ND | 212 |
| 10 | 100:0 | GF = 11 | 1.64 | 190 |
| 11 | 80:20 | GF = 20 | 2.77 | 109 |
| 12 | 50:50 | GF = 20 | 2.70 | absent |
| 13 | 50:50 | ZnAc = 0.14 | 0.94 | 104 |
| 14 | 50:50 | ZnAc = 0.5 | 0.68 | 219 |
| 15 | 50:50 | ZnAc = 0.25 + NaBz = 0.25 | 0.91 | 221 |
| 16 | 50:50 | FeAc = 0.5 | 2.91 | 161 |
| 17 | 50:50 | CuAc = 0.5 | 2.87 | 166 |
| 18 | 50:50 | CrAcac = 0.5 | ND | 157 |
| 19 | 50:50 | VAcac = 0.5 | ND | 155 |
| 20 | 50:50 | TiBut = 0.5 | ND | 134 |

What is claimed is:
1. A composition comprising poly(ethylene terephthalate) (PET) and poly(ethylene naphthalate) (PEN), in the form of a polymer blend and/or copolymer, in which the PET:PEN mol ratio is from 20:80 to 80:20, and from 0.25 to 1.5 wt %, based on the total weight of the composition, of a transition metal salt of a lower aliphatic or polymeric lower aliphatic carboxylic acid, said carboxylic acid containing up to six C-atoms.

2. A composition according to claim 1, in which the PET:PEN mol ratio is from 40:60 to 60:40.

3. A composition according to claim 1, in which the transition metal is selected from the group consisting of zinc, copper, molybdenum, chromium, nickel, vanadium, cobalt, iron, tungsten and titanium.

4. A composition according to claim 1, in which the transition metal is zinc.

5. A composition according to claim 1, containing a mixture of transition metal salts of said carboxylic acid or a double transition metal salt of said carboxylic acid.

6. A composition according to claim 1, containing a mixture of a transition metal salt of said carboxylic acid and an alkali metal salt of said carboxylic acids, or a corresponding double metal salt.

7. A composition according to claim 6, in which the alkali metal is lithium, potassium or sodium.

8. A composition according to claim 1, in which the alkali metal is sodium.

9. A shaped product formed from a composition according to claim 1.

10. A process for nucleating and crystallizing a composition comprising poly(ethylene) terephthalate (PET) and polyethylene naphthalate (PEN) in the form of a polymer blend and/or copolymer, comprising incorporating into such polymer blend and/or copolymer 0.25 to 1.5 wt. %, based on the total weight of the composition, of a transition metal salt of a lower aliphatic or polymeric lower aliphatic carboxylic acid, said carboxylic acid containing up to six C-atoms.

* * * * *